Feb. 20, 1945.  R. O. HURST  2,370,037
PROTECTIVE DEVICE FOR ELECTRICAL APPARATUS AND SYSTEMS
Filed Oct. 24, 1942
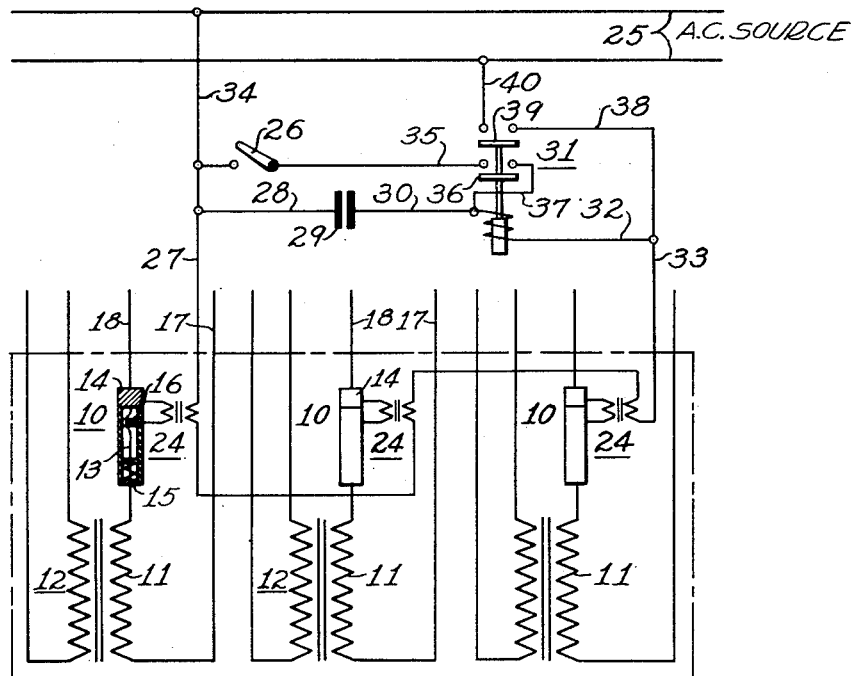
WITNESSES:
INVENTOR
Robert O. Hurst.
BY
ATTORNEY Patented Feb. 20, 1945

2,370,037

UNITED STATES PATENT OFFICE 2,370,037

PROTECTIVE DEVICE FOR ELECTRICAL APPARATUS AND SYSTEMS

Robert O. Hurst, Sharon, Pa., assignor to Westinghouse Electric & Manufacturing Company, East Pittsburgh, Pa., a corporation of Pennsylvania Application October 24, 1942, Serial No. 463,241

5 Claims. (Cl. 175—294)

The invention relates generally to protective devices for electrical apparatus and systems, and more particularly to protective devices which utilize fusible members for interrupting circuits upon the development of abnormal operating conditions.

The object of the invention is to provide auxiliary sources of current disposed to cooperate in fusing fusible protective links upon the development of predetermined operating conditions.

It is also an object of the invention to provide for interrupting all the circuits of polyphase electrical apparatus to completely disconnect the apparatus when the circuit of any one phase is interrupted upon the development of predetermined operating conditions.

The invention accordingly is disclosed in the embodiment thereof shown in the accompanying drawing and comprises the features of construction, combination of elements, and arrangement of parts which will be exemplified in the construction hereinafter set forth and the scope of the application of which will be indicated in the claims.

For a fuller understanding of the nature and objects of the invention, reference should be had to the following detailed description, taken in connection with the accompanying drawing in which:

Figure 1 is a diagrammatic view of the windings of a transformer showing the arrangement of a protective device constructed in accordance with the features of this invention; and Fig. 2 is a diagrammatic view showing how the protective device may be applied to protect polyphase electrical apparatus.

Referring now to the drawing and Fig. 1 in particular, a protective link shown generally at 10 is connected in circuit relation with the primary winding 11 of a transformer 12. While the protective link 10 is shown connected to protect a transformer in this embodiment of the invention, it may also be employed for protecting other electrical apparatus which may be subjected to similar operating conditions.

The protective link illustrated may be constructed in accordance with the teachings of my copending application Serial No. 463,242, filed October 24, 1942, Patent No. 2,351,969, granted June 20, 1944. In the particular protective link illustrated, the fusible conductor 13 extends between terminal members 14 and 15, the latter being so suspended in the lower portion of the protective link case that it may be discharged from the case when the fusible conductor is severed by a fusing process. A contact member 16 is provided and connected to a binding post for receiving an external conductor. As shown the member 16 makes electrical contact with fusible conductor 13 at a predetermined point between the terminal members 14 and 15. The particular position of the contact member 16 will depend upon the conditions to be met.

If the operating conditions of the electrical apparatus requires that only a small portion of the fusible conductor be connected across a portion of the primary winding 11, then the contact member 16 will be located near the lower end of the fusible conductor 13, while if the operating conditions of the electrical apparatus requires that a large portion of the fusible conductor be connected across a portion of the primary winding 11, then the contact member 16 will be located near the upper end of the fusible conductor 13.

The fusible conductor 13 may be made from any suitable material commonly used in the art for this purpose. A wire sold to the trade under the name "Everdure" has been found satisfactory for use in this type of protective link. Copper wire has also been used with success. The size of the "Everdure" wire may be selected in accordance with the teaching of Patent 2,223,726. In some instances, the fusible conductor may be provided with a tube as disclosed in the above-identified patent to cooperate in giving the fusible link predetermined fusing characteristics.

Generally, transformers and similar electrical apparatus employ a liquid dielectric in which the coils are immersed. The use of dielectric liquids is common and their function well known, therefore, a dielectric liquid has not been shown in the drawing. Further, liquid dielectrics play an important part in predetermining the fusing characteristics of the fusible conductor 13.

It is well known that in many applications of transformers and similar electrical apparatus that they are connected to power sources which can deliver an enormous amount of energy. Under such conditions the interruption of the circuits leading to the transformer or other similar apparatus becomes a difficult engineering problem. If the fusible conductor is fused or burned out when connected to a power source in which there is an enormous amount of energy stored, the dielectric is decomposed and the power source grounded through the arc stream of ionized gas. This is likely to result in the burning out of the coils to be protected.

In this protective device the fusible conductor is fused with a high current having comparatively low energy, thereby disconnecting the transformer or other electrical apparatus from the power source or line. The device for effecting this interruption of the electrical circuits to protect the electrical apparatus may be accomplished by the device to be described hereinafter.

Referring to Fig. 1 in particular, the primary winding 11 may be connected to a high tension power system (not shown) through the leads 17 and 18. In this particular instance only one protective link is connected in circuit relation with the coil, however it is to be understood that as many links as desired may be provided and they may be connected in circuit relation with both the primary and secondary coils.

In order to accelerate the fusing of the fusible conductor 13 when a fault or the like occurs, provision is made for connecting a portion of the high tension winding 11 across at least a portion of the fusible conductor 13. In the embodiment illustrated, a bimetal member 19 is mounted in the transformer case in any suitable manner. A contact member 20 is disposed on the bimetal member 19 in alignment with a stationary contact member 21. The stationary contact member 21 is connected through conductor 22 to the contact member 16 engaging the fusible conductor 13. The contact member 20 is electrically connected to the primary winding 11 by conductor 23 as shown.

Assuming now that the transformer is in operation and subject to overload conditions. Then the temperature of the dielectric will rise in accordance with the overloading of the transformer. As the temperature goes up the bimetal member 19 which is immersed in the dielectric liquid (not shown) raises the contact member 20 upwardly until it engages the stationary contact member 21. In this manner a portion of the primary winding is connected across the lower section of the fusible conductor 13. The result is an increase in the current flowing in the fusible conductor which cooperates in effecting a fusing process as soon as the loading conditions have become excessively high. As soon as the fuse blows, the transformer primary is disconnected from the line.

The closing of the contact members 20 and 21 establishes an electrical circuit which comprises a portion of the primary winding 11, conductor 23, contact members 20 and 21, conductor 22, contact member 16 and the lower portion of the fusible conductor 13, back to the primary winding 11. The connecting of the portion of the primary winding 11 across the lower portion of the fusible conductor 13 causes an increase in the current flow and a quick fusing of the fusible conductor 13.

In the modification of the invention illustrated in Fig. 2, the protective link is applied to polyphase electrical apparatus. In this instance a three-phase transformer is shown with a protective link connected in circuit relation with the primary winding of each of the phase windings. The protective links 10 may or may not be provided with bimetal controlled switching members such as illustrated in Fig. 1 for connecting a portion of each primary winding across each fusible conductor. In the interest of simplicity, such windings are not shown but it could be applied in accordance with the showing of Fig. 1.

In this embodiment of the invention auxiliary transformers 24 are provided in conjunction with the fusible links 10. As illustrated, the secondary of each transformer 24 is connected to the members 14 and 16 thus placing the secondary across a portion of the fusible conductor 13. The primary windings of the transformer 24 are connected in series circuit relation and through a circuit controlling arrangement to a power source 25 which in this instance is illustrated as a power line.

A switch 26 which responds to abnormal conditions in the electrical apparatus is connected in a relay control circuit. The operation of switch 26 may be effected by a bimetal which responds to temperature or some suitable pressure device well known in the art or a combination of the two, or other equivalent devices.

The arrangement of the switching system and its function will best be understood by the description of an operation. Assuming now that a switch 26 is closed and that a surge or overload or other fault occurs and that the upper portion of the fusible conductor 13 is fused. When the arc occurs a voltage will be established across the terminal member 14 and contact member 16. This voltage is applied across the secondary winding of the transformer 24 and is sufficient to induce a voltage in the primary winding.

When the voltage is induced in the primary winding a circuit is established which may be traced as follows: from the primary winding of the excited transformer 24 through conductors 27 and 28, condenser 29, conductor 30, the actuating coil of the relay shown generally at 31, conductors 32 and 33 and the primary windings of the tarnsformers provided in connection with the protective links connected in circuit relation with the other phase windings of the transformer, back to the primary winding illustrated at the left of Fig. 2. This results in the charging of the condenser 29 which in turn discharges through the actuating coil of relay 31. When the coil of relay 31 is energized the contact members 36 and 39 are actuated upwardly into circuit closing positions.

The relay 31 is actuated upwardly connecting the primary of the transformers 24 across the power source and establishing a holding circuit for the relay. The holding circuit may be traced as follows: from the power source 25 through conductor 34, switch 26 and conductor 35, contact member 36 of the relay 31, conductor 37, the actuating coil of the relay 31, conductors 32 and 38, the contact member 39 of the relay 31 and conductor 40, back to the other side of the power source. The transformer circuit may be traced from the power source 25 through conductors 34 and 27, the primary of the transformers 24 connected in series circuit relation, conductors 33 and 38, the contact member 39 and conductor 40, back to the other side of the power source.

In this manner an additional voltage is imposed across the upper sections of the fusible conductors provided in the protective links connected in circuit relation with the windings of the other phases of the transformer. This causes an increase in the current flowing in the fusible conductors and a quick fusing operation. In this manner when one protective link is fused, the other protective links are promptly fused, thus disconnecting the transformer or other electrical apparatus completely from the line. It will be readily appreciated that many other auxiliary sources of voltage may be provided which will be the equivalent of the transformers 24. A portion of the primary winding might be connected across the fusible conductor, other transformers may be provided, and may other expedients well known in the electrical art may be utilized.

Since certain changes may be made in the above protective device and system, and different embodiments of the invention could be made without departing from the scope thereof, it is intended that all matter contained in the above description or shown in the accompanying drawing shall be interpreted as illustrative and not in a limiting sense.

I claim as my invention:

1. In a protective system for polyphase electrical apparatus provided with electrical coils to be protected in each phase, in combination, a fusible conductor having predetermined fusing characteristics connected in circuit relation with the electrical coils of each phase, a transformer connected across at least a portion of the fusible conductor connected in circuit relation with the electrical coils of each phase, a relay controlled circuit for imposing a voltage across each transformer to increase the flow of current in the fusible conductor, and means responsive to the fusing of one fusible conductor for actuating the relay to close the circuit provided for supplying said transformer, thereby to increase the flow of current in a portion of the fused fusible conductor and to cooperate in interrupting the circuits through all phases of the electrical apparatus.

2. In a protective system for polyphase electrical apparatus provided with electrical coils to be protected, in combination, a fusible conductor having predetermined fusing characteristics connected in circuit relation with the electrical coil of each phase, a transformer connected across at least a portion of the fusible conductor connected in circuit relation with each coil, a source of power to which said transformers are connected, switching means for controlling the transformer circuits, and means disposed to respond to the fusing of one fusible conductor for effecting the operation of the switching means to connect the transformers to the power source, thereby to increase the flow of current in the one fused fusible conductors when any fuse is fused.

3. In a protective system for polyphase transformers provided with electrical coils to be protected in each phase, a fusible conductor having predetermined fusing characteristics connected in circuit relation with the coils of each phase, auxiliary transformers connected across at least a portion of each fusible conductor, a power source, means for connecting the power source across each transformer, means responsive to the fusing of one fusible conductor for effecting the operation of the means provided for connecting the transformers to the power source, thereby to cooperate in increasing the current flow in the unfused fusible conductors.

4. In a protective system for polyphase electrical apparatus provided with electrical coils to be protected connected in each phase, in combination, a fusible conductor having predetermined fusing characteristics connected in circuit relation with the electrical coils of each phase, a transformer having primary and secondary windings for each fusible conductor, the secondary of each transformer being connected across at least a portion of the corresponding fusible conductor, a source of power, relay controlled means for connecting the primary windings of the transformers across the source of power, and means responsive to the fusing of any one of said fusible conductors for energizing the relay to connect the primary windings of said transformers across the source of power thereby to impose a voltage across the fusible conductors to increase the flow of current in the fusible conductors to cooperate in effecting the fusing of said fusible conductors to completely interrupt the circuits through all phases of the electrical apparatus.

5. In a protective system for polyphase electrical apparatus provided with electrical coils to be protected in each phase, in combination, a fusible conductor having predetermined fusing characteristics connected in circuit relation with the electrical coils of each phase, a transformer having primary and secondary windings for each fusible conductor, the secondary of each transformer being connected across at least a portion of its corresponding fusible conductor, a relay switch connected in circuit relation with the primary windings of the transformers and disposed to connect the primary windings across the source of power, and means connected in circuit relation with the relay switch and responsive to the fusing of a fusible conductor for energizing the relay switch to actuate it to connect the primary windings of the transformers across the source of power thereby to utilize the transformers for imposing a voltage across the fusible conductors to increase the flow of current and to cooperate in effecting the fusing of all the fusible conductors upon the fusing of one fusible conductor.

R. O. HURST.